Jan. 8, 1924.
J. C. ENDEBROCK
1,479,796
TRAILER COUPLING DEVICE
Filed Oct. 24, 1919    2 Sheets-Sheet 1
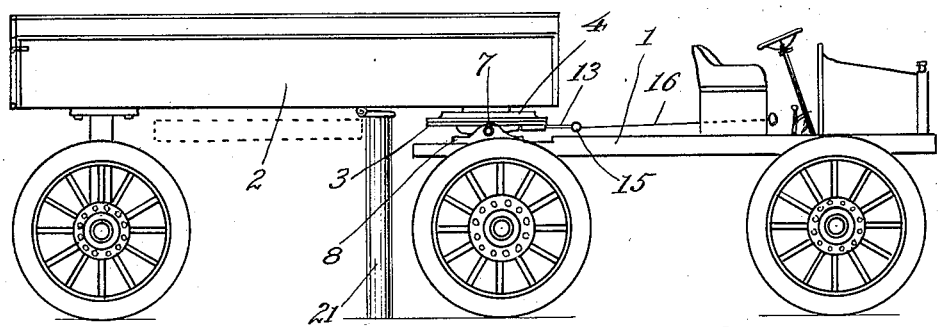
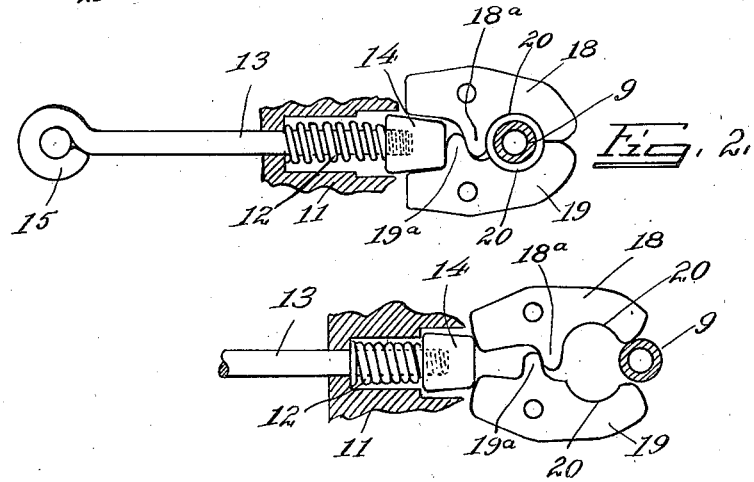
Inventor:
John C. Endebrock
By [signature]
Attorneys.

Jan. 8, 1924.  1,479,796
J. C. ENDEBROCK
TRAILER COUPLING DEVICE
Filed Oct. 24, 1919  2 Sheets-Sheet 2
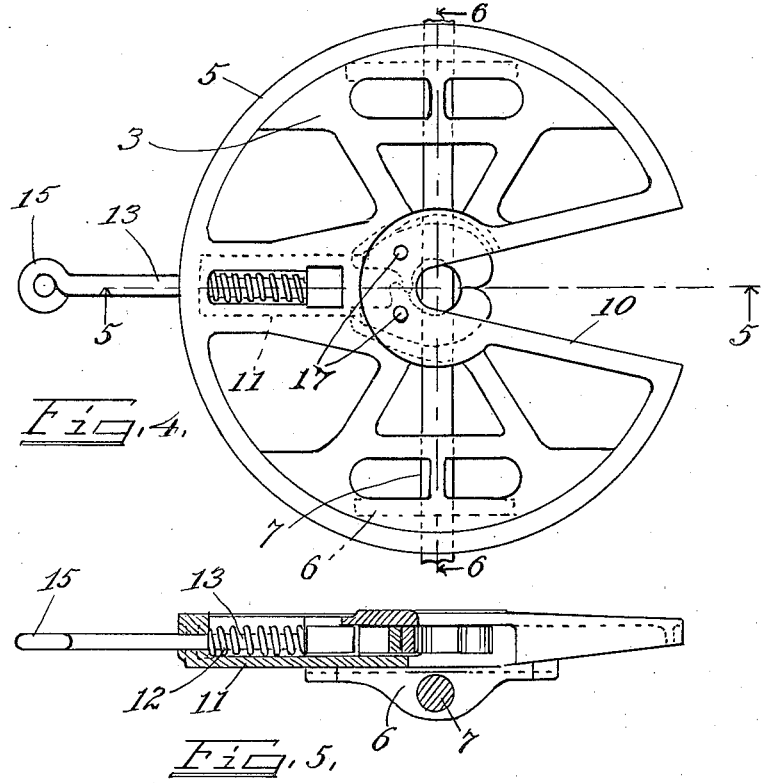
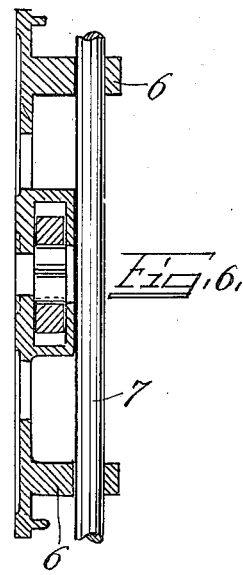
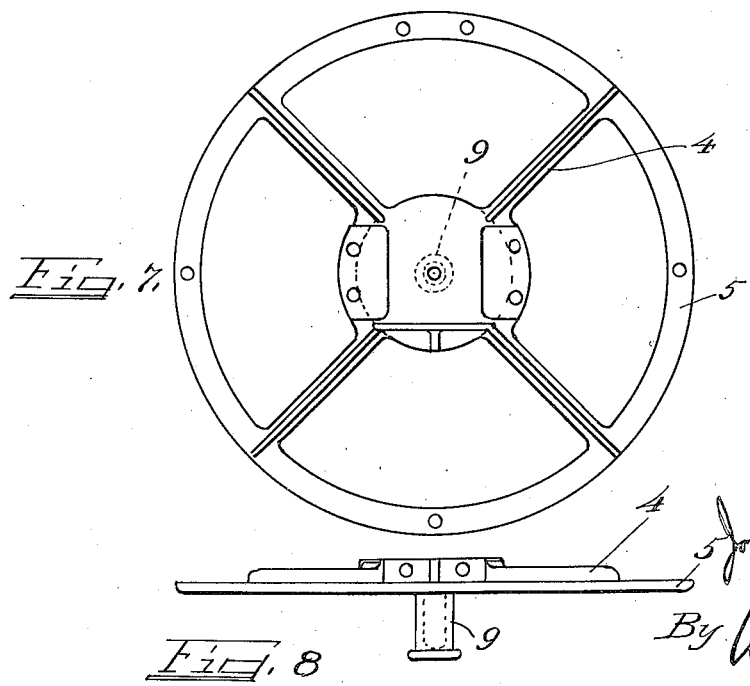
Inventor:
John C. Endebrock
By Allen & Allen
Attorneys.

Patented Jan. 8, 1924.

1,479,796

UNITED STATES PATENT OFFICE.

JOHN C. ENDEBROCK, OF CINCINNATI, OHIO, ASSIGNOR TO THE TRAILMOBILE COMPANY, OF CINCINNATI, OHIO, A CORPORATION OF OHIO.

TRAILER COUPLING DEVICE.

Application filed October 24, 1919. Serial No. 332,995.

*To all whom it may concern:*

Be it known that I, JOHN C. ENDEBROCK, a citizen of the United States, and a resident of Cincinnati, in the county of Hamilton and State of Ohio, have invented certain new and useful Improvements in Trailer Coupling Devices, of which the following is a full, clear, and exact description, reference being had to the accompanying drawings, forming part of this specification.

My invention relates to devices for coupling trailers to tractor vehicles, and has as its special object the provision of a combination fifth wheel and automatic coupler for such a purpose.

In the past, there have been fifth wheel devices provided for taking care of relative rotation between trailers with tractors which also served as means for connecting the tractor and trailer together, this sort of fifth wheel being used particularly in what is known as a semi-trailer, wherein the body of the trailer vehicle is placed so as to rest its forward end on the tractor vehicle.

My device is especially adapted for use with such semi-trailers, and in the drawing is shown as coupling a two-wheeled trailer to a tractor vehicle with the body of the trailer resting on the tractor vehicle.

So far as I am aware, in the use of prior fifth wheel devices for the above purpose, the connection has had to be completed by lifting up the trailer body and dropping it down over the tractor, so that the two fifth wheel devices could be attached to each other. In my device, however, the connection is made horizontally by merely backing the tractor up against or under the trailer.

In devices of the past, fifth wheels of this type have been arranged so that there was a rocking connection formed between the fifth wheel plates, or between the tractor plate and the tractor frame. Among other features of my invention is the employment of this rocking feature for my tractor plate, whereby there is allowed considerable latitude in relative vertical positions between the trailer and the tractor, when utilizing my device as a coupler. I also provide, in connection with the device, for considerable latitude in relative horizontal positions of the tractor and trailer, during coupling, the object of these two features being to permit the tractor to be backed under the trailer body, so as to lift the trailer to the right point for coupling, and shift it sideways for the correct lateral position for coupling.

By showing my invention as applied in this particular connection, I do not, however, desire that its application should be so limited in the construing of the claims appended to this application.

My objects and advantages I accomplish by that certain construction and arrangement of parts to be hereinafter more specifically pointed out and claimed.

In the drawings,

Figure 1 is a side elevation of a tractor and trailer showing my device in use.

Figure 2 is a detail plan view of the coupler device in closed and locked position.

Figure 3 is a like view of the coupler in open position, ready to receive the depending pin of the trailer fifth wheel plate.

Figure 4 is a plan view of the tractor fifth wheel.

Figure 5 is a section on the line 5, 5, of Figure 4.

Figure 6 is a section on the line 6, 6, of Figure 4.

Figure 7 is a plan view of the trailer fifth wheel taken from above.

Figure 8 is a side elevation of the trailer fifth wheel plate.

The device is shown as used with a tractor 1 and a trailer 2. These two vehicles are more or less diagrammatically shown, as their details of construction have nothing to do with this invention. The fifth wheel plate 3 of the tractor is secured on the upper side of the frame or an extension thereof, of the tractor. The fifth wheel plate 4 of the trailer is secured on the under side of the frame or body of the trailer. Each of the two plates has the usual annular bearing surfaces 5, usually employed with fifth wheels.

As a preferable means of mounting my fifth wheel plate 3 on the tractor, I provide journals 6, 6, on the lateral edges of the plate through which passes a shaft 7, which is also journaled in the plates 8, 8, secured to the frame of the tractor.

The plate 4 is secured rigidly to the under side of the trailer body, and has a depending post 9 of sufficient length to give some latitude in the necessary vertical adjustment of the two plates during coupling. This post serves the function of a king bolt, in securing the two parts of the fifth wheel together, and the annular bearing surfaces of the two plates bear against each other to provide the horizontal support.

The plate 3 for the tractor has a fixed jaw 10 formed at right angles to the mounting shaft 7, and a depending box 11 opposite the jaw in which is seated a coil spring 12, that surrounds a plunger rod 13. The plunger 14 is pressed by the spring toward the base of the fixed jaw, and the outer end of the rod is formed with an eye or other handle 15 for operating it, as, for example, by a cord 16.

Pivotally mounted on pins 17, 17, located behind the center of the plate are the two coupler jaws 18, 19. These coupler jaws are of special conformation, having the hooks 20, which, when said jaws are closed, will form a circular journal at the apex of the fixed jaw of the fifth wheel plate, which is also the center of said plate.

Behind the hooked ends 20 of the coupler jaws are the noses 18ª and 19ª respectively, of which the nose 18ª lies in front of the nose 19ª, whereby a pressure against nose 18ª will cause the jaw plates to swing closed. When the jaws are closed, the rearward ends thereof are opened to such a position that the plunger 14 fits in between them, thereby holding them apart and the jaws are closed. When the jaws are open, however, the plunger by resting against the said ends will tend to hold the jaws in open position.

It can be seen that the plunger will be automatically spring-pressed into the space between said ends, to retain the jaws closed, if it is not positively held out by the operator, and that the movement of the post 9 toward the center of the fifth wheel plate, guided thereto by the jaw thereof, will cause the coupler jaws to close automatically around it.

When the operator desires to couple the trailer to the tractor, the trailer being suitably held up as by a hinged leg 21, he will back the tractor to bring the fifth wheel plate under the central portion of the trailer. Since the plate 3 can rock, it will not jam, should the trailer be left in an improper vertical position, but will tip under the trailer and raise it to the correct position. The coming of the post against the sides of the jaw in the fifth wheel plate will guide it toward the center thereof, the trailer shifting its position if necessary to permit this movement. As soon as the post comes in between the jaws of the coupler it will close them, and the plunger will automatically slide into locking position.

When desiring to uncouple the trailer, the leg 21 will first be let down, and the operator will then pull out the plunger from the coupler, which will permit the jaws to swing open, so that the tractor can be driven out from under the trailer body.

As stated, the rocking feature is merely a preferred method of mounting, and the type of fifth wheel generally has been selected by me to illustrate only the preferred embodiment of my invention. For example, I have shown no resilient mounting for either fifth wheel plate, whereas any desired form of resilient mounting may be adopted.

Having thus described my invention, what I claim as new and desire to secure by Letters Patent, is:

1. A fifth wheel comprising two sections, said sections having plane surfaces in contact with each other, and being non-rotatable in horizontal planes on their mountings, one section having a guiding jaw, and pivoted coupler jaws at the apex of said jaw and the center of the plate adapted to release and to enclose a post on the other section, the first section having means to be controlled by an operator for locking and unlocking said jaws into and from closed position over the post.

2. A device of the character described, comprising a fifth wheel plate for a trailer, a fifth wheel plate for a tractor, both of said plates having plane surfaces adapted to contact with each other, and being non-rotatable in horizontal planes on their mountings, and coupler means comprising a pair of pivoted jaws for automatically connecting and locking the fifth wheel plates together, said coupler means and plates having means for allowing for incorrect adjustment of said parts horizontally and vertically prior to coupling of them together.

3. The combination of a fifth wheel plate for a tractor vehicle, said plate having a pair of pivoted coupler jaws adjacent its center, a fifth wheel plate for a trailer vehicle, one of said plates being tiltably mounted, a post on the trailer plate to be engaged by the jaws, and guiding means to direct the post to the jaws, upon movement of the trailer fifth wheel plate toward the tractor fifth wheel plate, both of said plates having plane surfaces adapted to contact with each other, and being non-rotatable in horizontal planes on their mountings said coupler jaws adapted to receive and automatically engage and lock the post in rotatable but non-sliding position.

4. The combination of a fifth wheel plate for a tractor vehicle and fifth wheel plate for a trailer vehicle, one of said plates being tiltably mounted, and one of said plates having a pair of pivoted coupler jaws adjacent its center, a post on the plate having no jaw to be engaged by the said coupler and guiding means to direct the post to the jaws, upon movement of the trailer fifth wheel plate toward the tractor fifth wheel plate, said means comprising a tapering fixed jaw formed in the fifth wheel plate with its apex adjacent said jaws, and its mouth at the periphery of the said plate, and said plates being non-rotatable in horizontal planes on their mountings.

5. The combination with a tractor and a trailer, of a fifth wheel plate mounted on the tractor, having a pair of coupler jaws pivoted on the tractor plate, a fifth wheel plate mounted on the under side of the trailer, and having a post depending therefrom, both of said plates being non-rotatable horizontally on their mountings, said post being adapted to come into engagement with said jaws, and spring controlled means to engage the jaws and lock them around the said post, and a guide opening in the plate having the coupler through which opening the post moves to and from coupling relation.

6. The combination with a tractor and a trailer, of a fifth wheel plate mounted on the tractor, having a pair of coupler jaws pivoted beneath its contact surface to swing horizontally, a fifth wheel plate mounted on the under side of the trailer, and having a post depending therefrom, both of said plates being non-rotatable horizontally on their mountings, said post being adapted to come into engagement with said jaws, and spring controlled means for locking the jaws around the said post, said means comprising a plunger spring pressed toward said jaws, to engage the same and hold them locked until the plunger is withdrawn.

JOHN C. ENDEBROCK.